United States Patent
Hamada

(10) Patent No.: US 7,926,991 B2
(45) Date of Patent: Apr. 19, 2011

(54) CONNECTING DEVICE FOR VEHICLE-MOUNTED LIGHT SOURCE DEVICE AND LIGHT SOURCE DEVICE CONNECTED THERETO

(75) Inventor: Katsushige Hamada, Saitama (JP)

(73) Assignee: BRM21 Co., Ltd., Saitama (JP)

( * ) Notice: Subject to any disclaimer, the term of this patent is extended or adjusted under 35 U.S.C. 154(b) by 0 days.

(21) Appl. No.: 11/787,869

(22) Filed: Apr. 18, 2007

(65) Prior Publication Data

US 2007/0249184 A1 Oct. 25, 2007

(30) Foreign Application Priority Data

Apr. 19, 2006 (JP) ................................. 2006-002959

(51) Int. Cl.
*B60Q 1/26* (2006.01)
*H01R 33/00* (2006.01)
*F21V 21/00* (2006.01)

(52) U.S. Cl. .......................... 362/490; 362/488; 362/640

(58) Field of Classification Search .................. 362/800, 362/490, 249, 640, 95, 488, 549; 439/36
See application file for complete search history.

(56) References Cited

U.S. PATENT DOCUMENTS

| | | | |
|---|---|---|---|
| 5,471,375 A * | 11/1995 | Lau | 362/260 |
| 6,338,647 B1 * | 1/2002 | Fernandez et al. | 439/490 |
| 6,752,517 B2 * | 6/2004 | Hildebrand et al. | 362/231 |
| 7,183,743 B2 * | 2/2007 | Geiger | 320/111 |
| 7,224,086 B2 * | 5/2007 | Germagian et al. | 307/128 |
| 7,270,555 B2 * | 9/2007 | Wu | 439/238 |

FOREIGN PATENT DOCUMENTS

JP 2001-294079 10/2001

* cited by examiner

*Primary Examiner* — Jong-Suk (James) Lee
*Assistant Examiner* — David R Crowe
(74) *Attorney, Agent, or Firm* — Porzio, Bromberg & Newman, P.C.

(57) ABSTRACT

A connecting device is provided which allows easy replacement with a light source device having a light emitting diode serving as a light source at low cost and without changing a vehicle-side connection configuration and the shape of a socket for attaching a bulb-type lamp. There is also provided a light source device connected to the connecting device. A power source adapting connector has an external shape formed so as to conform to a socket for attaching conventional bulb-type lamps. The power source adapting connector includes: a connector housing which contains therein a female connector and has positive and negative electrodes on the exterior thereof; the female connector which is contained in the connector housing and is to be connected to a male connector of a light source unit; and an attaching/detaching plate which is attached to an open end portion (upper end portion) of the connector housing.

6 Claims, 7 Drawing Sheets

(a)

(b)

(c)

(a)

(b)

(c)

(a)

(b)

(c)

(a)

801

(b)

802

(c)

803

CONNECTING DEVICE FOR VEHICLE-MOUNTED LIGHT SOURCE DEVICE AND LIGHT SOURCE DEVICE CONNECTED THERETO

BACKGROUND OF THE INVENTION

1. Field of the Invention

The present invention relates to a technology for vehicle-mounted lighting. For example, the invention relates to a connecting device used for in-vehicle lighting used as interior lighting for automobiles and the like and to a light source device connected to the connecting device.

2. Description of the Related Art

Conventionally, three types of bulb-type lamps 801 to 803 having the shapes shown in FIGS. 5(*a*) to 5(*c*) are used as light sources for interior lighting in automobiles and the like, such as room lamps, ignition key light, foot light, light for door handles and door switches, and spotlights located at a forward part of the roof. A bulb-type lamp 801 is mounted in each of sockets 901 and 902 provided inside a lighting-power supply unit 900, shown in FIG. 6, attached to an interior wall inside a vehicle. Furthermore, a bulb-type lamp 802 is mounted in a socket 1001 composed of two electrodes provided inside a lighting-power supply unit 1000 shown in FIG. 7, and a bulb-type lamp 803 is mounted in each of sockets 1002 and 1003 provided inside the lighting-power supply unit 1000 shown in FIG. 7.

These bulb-type lamps 801 to 803 have economical disadvantages, for example, in that the life of the lamps is short and the power consumption is high. In order to solve such disadvantages, for example, a light source device for a vehicle has been disclosed in Japanese Patent Laid-Open Publication No. 2001-294079. In this light source device, a light emitting diode is used as a light source, thereby achieving long life and low power consumption.

However, in the configuration of the light source device described in Japanese Patent Laid-Open Publication No. 2001-294079, the light emitting diode is directly mounted on a substrate, and the substrate itself is contained in a connector housing. Furthermore, the connector housing is connected to a connector connected to wire harnesses on a vehicle body side, whereby a socket for attaching the light source is omitted. Therefore, sockets for attaching conventional bulb-type lamps cannot be utilized in fitting the light source device, and thus the configuration of parts connected to the wire harnesses on a vehicle body side must also be changed, causing a problem in that replacement of conventional bulb-type lamps with this light source device requires considerable effort and cost.

In view of the above circumstances, it is an object of the present invention to provide a connecting device for a vehicle-mounted light source device. This connecting device allows easy replacement with a light source device having a light emitting diode serving as a light source at low cost and without changing a vehicle-side connection configuration or the shape of the socket for attaching a bulb-type lamp. It is another object of the invention to provide a light source device connected to the connecting device.

SUMMARY OF THE INVENTION

The above object is achieved by the present invention which provides a connecting device for a vehicle-mounted lighting device, the connecting device connecting a light source device to a lighting-power supply unit in a vehicle. The connecting device includes: a connector housing having an external shape and electrodes which are formed so as to conform to a shape and an electrode configuration, respectively, of a connecting portion provided for connecting to the light source device in the lighting-power supply unit; and a connector which is contained in the connector housing and has connection terminals for connection to the light source device, wherein power from the lighting-power supply unit is supplied to the light source device via the connecting portion, the electrodes of the connector housing, and the connection terminals of the connector.

The above connecting device allows easy replacement of a conventional light source device with a light source device having a light emitting diode or the like serving as the light source at low cost without changing a vehicle-side connection configuration or the shape of the connecting portion (such as a socket) to which the light source device is to be connected.

In the connecting device of the above aspect, the connecting portion of the lighting-power supply unit may have a shape and an electrode configuration which are designed to be connected to a bulb-type lamp serving as the light source device. In addition to this, the connector housing may have the external shape and the electrodes which are formed so as to conform to the shape and the electrode configuration, respectively, of the connecting portion for connection to the bulb-type lamp. In this manner, the above object is achieved.

The above connecting device allows easy replacement of a bulb-type lamp with a light source device having a light emitting diode or the like serving as the light source at low cost and without changing a vehicle-side connection configuration or the shape of the connecting portion (such as a socket) to which the bulb-type lamp is to be connected.

In the connecting device of the above aspect, the connector housing may be provided, in one end portion thereof, with an attaching/detaching member for attaching/detaching the connector housing. In this manner, the above object is achieved.

According to the above connecting device, an attaching/detaching operation of the connecting device with respect to the connecting portion for a vehicle-mounted lighting device is facilitated.

Furthermore, the above object is achieved by the present invention which provides a light source device which is to be connected to a lighting-power supply unit of a vehicle. The light source device includes: a substrate which has a light emitting diode mounted on a surface thereof and has a circuit pattern formed thereon for supplying power to the light emitting diode; a connector having a first end connected to the circuit pattern and a second end connected to the lighting-power supply unit; and a protection member disposed in a peripheral portion of the substrate and protruding above a surface of the substrate to protect at least the light emitting diode.

According to the above light source device, the light emitting diode mounted on the surface of the substrate can be prevented from contacting components of the lighting-power supply unit and other components, and the light emitting diode and the components of the lighting-power supply unit can thereby be protected from electrical or thermal damage. Accordingly, the reliability of the light source device can be improved.

The connecting device of the present invention allows easy replacement of a conventional light device with a light source device having a light emitting diode or the like serving as a light source at low cost without changing a vehicle-side connection configuration or the shape of a connecting portion (such as a socket) to which the light source device is to be connected.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Hereinafter, embodiments of the present invention will be described with reference to the accompanying drawings.

First Embodiment

Figure 1:
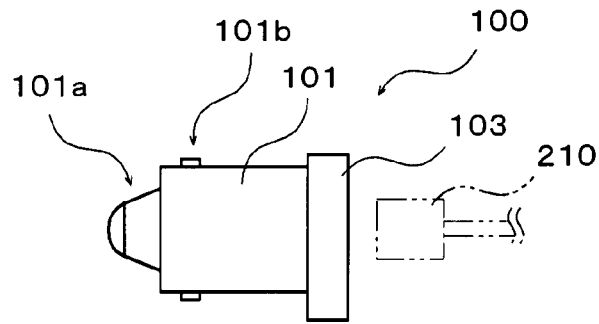
FIGS. 1(a) to 1(c) show a power source adapting connector in accordance with a first embodiment of the present invention, FIG. 1(a) being an external view as viewed from a side of the power source adapting connector, FIG. 1(b) being an external view as viewed from the upper side thereof, and FIG. 1(c) being an external view as viewed from the bottom side thereof.
Figure 1:
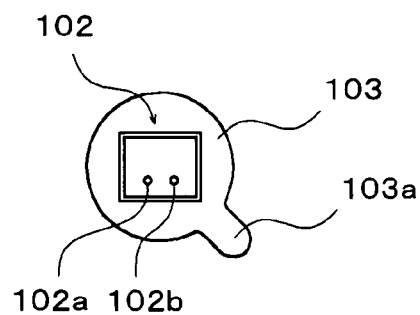
Figure 1:
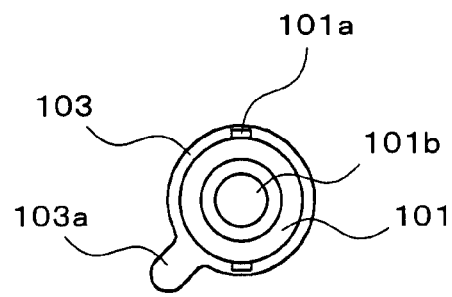

FIGS. 1(a) to 1(c) are external views of a power source adapting connector 100 serving as a light source device-connecting device in accordance with a first embodiment, as viewed from three different directions. FIG. 1(a) is an external view of the power source adapting connector 100 as viewed from a side thereof, and FIG. 1(b) is an external view as viewed from the upper side thereof. Furthermore, FIG. 1(c) is an external view of the power source adapting connector 100 as viewed from the bottom side thereof.

The power source adapting connector 100 has an external shape which is formed so as to conform to the shape of the socket 901 to which the conventional bulb-type lamp 801 described above is attached. As shown in FIGS. 1(a) to 1(c), the power source adapting connector 100 includes: a connector housing 101 which contains therein a female connector 102 and has a positive electrode 101a and a negative electrode 101b on the exterior thereof; the female connector 102 which is contained in the connector housing 101 and is to be connected to a male connector 210 of a light source unit 200 described later; and an attaching/detaching plate 103 which is attached to an open end portion (upper end portion) of the connector housing 101. On the outer periphery of the attaching/detaching plate 103, a protrusion 103a is provided to facilitate grasping the connector 100.

As shown in FIG. 1(b), pin-shaped connection terminals 102a and 102b are provided inside the female connector 102. The pin-shaped connection terminals 102a and 102b are electrically connected to the positive electrode 101a and the negative electrode 101b, respectively, on the connector housing 101.

With the above configuration, the power source adapting connector 100 can be fitted into each of the sockets 901 and 902 provided in the lighting-power supply unit 900 described above without any modification to the sockets, in the same manner as conventional bulb-type lamps.

Figure 2:
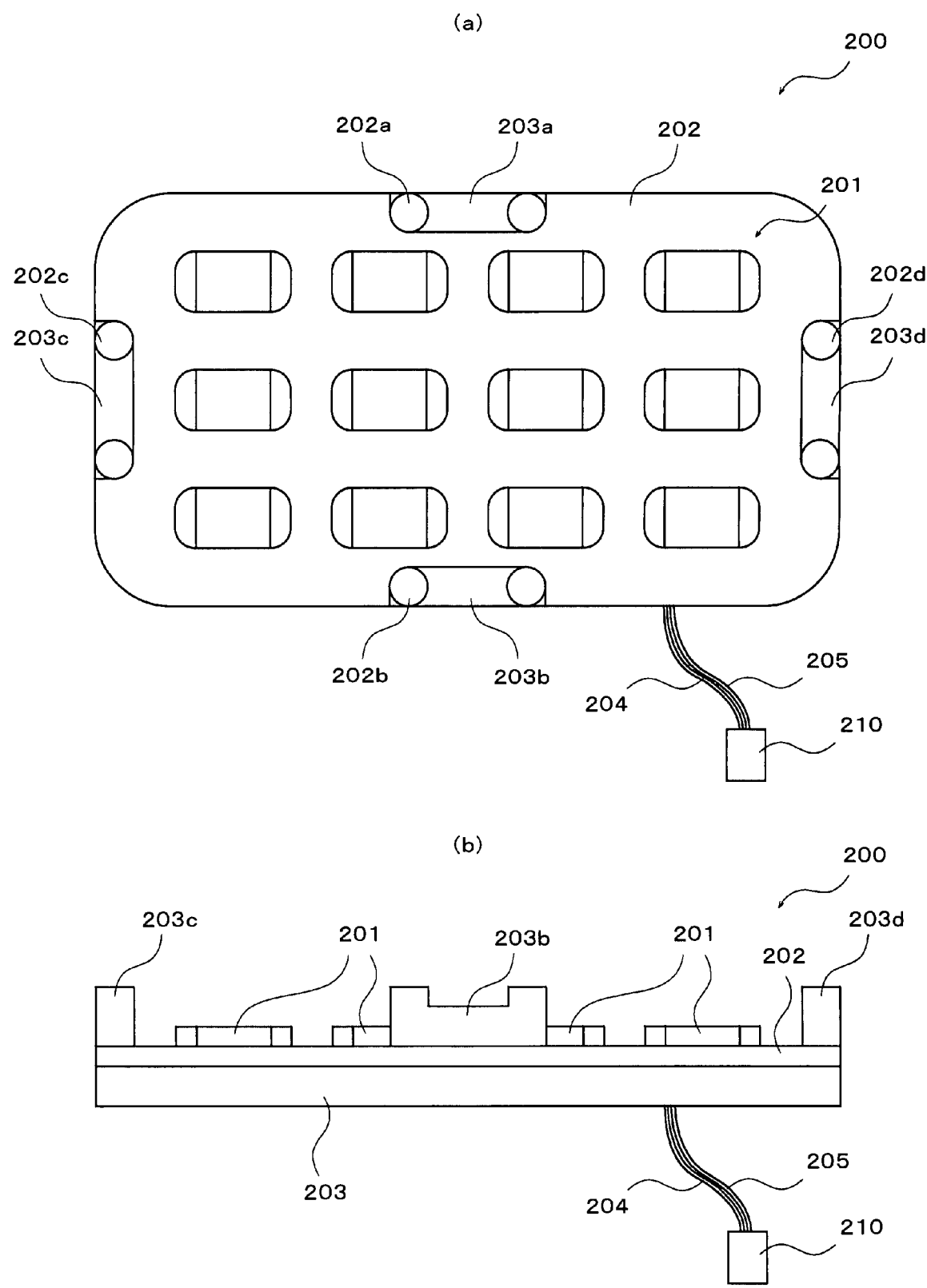
FIGS. 2(a) and 2(b) show a light source unit in accordance with the first embodiment of the present invention, FIG. 2(a) being a plan view as viewed from the upper side of the light source unit, and FIG. 2(b) being a view as viewed from a side thereof.

With reference to FIGS. 2(a) and 2(b), a description will now be given of the configuration of the light source unit 200 connected to the above female connector 102 via the male connector 210. FIG. 2(a) is a plan view of the light source unit 200 as viewed from the upper side thereof, and FIG. 2(b) is a view as viewed from a side thereof.

As shown in FIGS. 2(a) and 2(b), the light source unit 200 includes: a substrate 202 having a surface on which a plurality of chip-like light emitting diodes 201 (twelve diodes in the first embodiment) are mounted by soldering or the like; a support plate 203 which is provided on the rear surface of the substrate 202 so as to intimately contact the rear surface and which has the same face area as the substrate 202; a positive electrode lead wire 204 and a negative electrode lead wire 205 each having a first end portion connected to a circuit pattern (not shown) formed on the rear surface of the substrate 202; and the male connector 210 connected to a second end portion of each of the lead wires 204 and 205.

Furthermore, protection protrusions 203a to 203d are formed in the upper, lower, left, and right side edges, respectively, of the support plate 203. In this instance, the protection protrusions 203a to 203d are provided to prevent the light emitting diodes 201 mounted on the surface of the substrate 202 from contacting other components (such as components inside the lighting-power supply unit 900 in which the light source unit 200 is to be contained).

Moreover, notch portions 202a to 202d are formed in the upper, lower, left, and right side edges, respectively, of the substrate 202 such that their positions correspond to the positions on the support plate 203 in which the above protection protrusions 203a to 203d are formed. The protection protrusions 203a to 203d can accordingly protrude above the substrate 202 through the respective notch portions 202a to 202d.

Furthermore, in the male connector 210 tube-shaped connection terminals (not shown) are contained which are connected to the second end portions of the lead wires 204 and 205, respectively, and are to be connected to the pin-shaped connection terminals 102a and 102b, respectively, in the above female connector 102.

One power source adapting connector 100 is fitted into the socket 901, and another one is fitted into the socket 902. Subsequently, the male connector 210, which is connected to the lead wires 204 and 205 connected to the light source unit 200, is connected to the female connector 102 in each of the power source adapting connectors 100. Then, each light source unit 200 is seated in a space in the lighting-power supply unit 900, whereby the attachment operation for each light source unit 200 is completed. At this time, the positive electrode 101*a* and the negative electrode 101*b* of the connector housing 101 of each of the power source adapting connectors 100 are electrically connected to a positive electrode and a negative electrode (not shown), respectively, in each of the sockets 901 and 902.

Thereafter, power from the lighting-power supply unit 900 can be supplied to the substrate 202 of each light source unit 200 via the positive and negative electrodes (not shown) in each of the sockets 901 and 902, the positive electrode 101*a* and the negative electrode 101*b* of the connector housing 101 of each of the power source adapting connectors 100, the female connector 102 in the connector housing 101, the male connector 210, and the lead wires 204 and 205.

When the power source adapting connector 100 is to be detached from the socket 901 or 902, the protrusion 103*a* of the attaching/detaching plate 103 is grasped and moved in a predetermined direction, whereby the power source adapting connector 100 can be easily detached from the socket 901 or 902.

As described above, in the power source adapting connector of the first embodiment, the electrodes and the connector housing thereof are formed such that the electrodes and the external shape of the connector housing conform to the shape of a socket into which a conventional bulb-type lamp can be fitted. In addition to this, the female connector connectable to the light source unit is seated in the connector housing. Therefore, the power source adapting connector can be fitted into a bulb-type lamp socket in a lighting-power supply unit without any modification, and thus the connection and seating procedure for the light source unit is simplified.

Hence, when the light source of a light source device is changed from a bulb-type lamp to a light source employing a light emitting diode, no modifications need to be made to the electrical connection structure on the lighting-power source unit side, and the procedure for the electrical connection can be simplified. Therefore, the extension of life and reduction of power consumption of the light source of vehicle-mounted lighting devices can be achieved with a low cost and simple operation.

Furthermore, in the light source unit of the first embodiment, the protection protrusion is provided on four portions (the upper, lower, right, and left side edges) of the substrate, whereby the light emitting diodes mounted on the surface of the substrate are prevented from contacting components inside the lighting-power supply unit and other components. Therefore, the light emitting diodes and the components inside the lighting-power supply unit can be protected from electrical or thermal damage, and thus the reliability of the light source unit can be improved.

In the first embodiment, an example is shown in which the twelve light emitting diodes 201 are mounted as the light source unit 200, but the number of the light emitting diodes 201 mounted in the unit is not limited thereto. Of course, the number can be changed according to the specifications and the like of a lighting-power supply unit to which the light source unit 200 is to be connected.

Second Embodiment

In a second embodiment, a description will now be given of a power source adapting connector for replacing the above bulb-type lamp 802 with the light source unit of embodiment 1.

Figure 3:
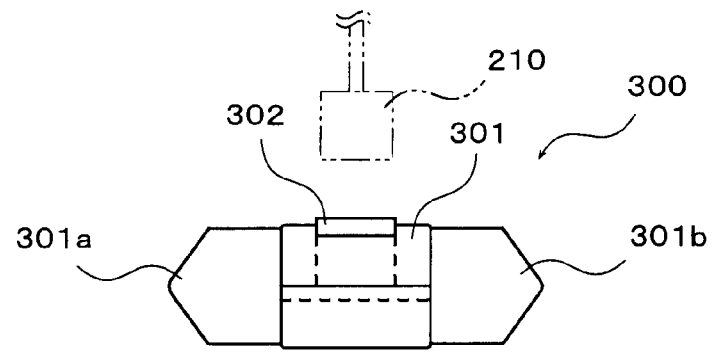
FIGS. 3(a) to 3(c) show a power source adapting connector in accordance with a second embodiment of the present invention, FIG. 3(a) being an external view as viewed from the front of the power source adapting connector, FIG. 3(b) being an external view as viewed from the upper side thereof, and FIG. 3(c) being an external view as viewed from the right end thereof.
Figure 3:
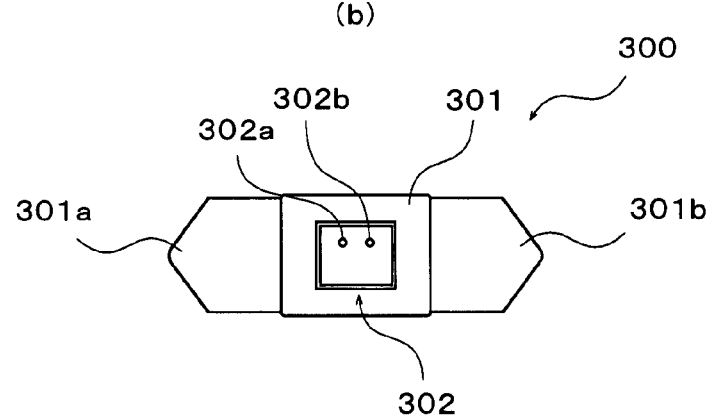
Figure 3:
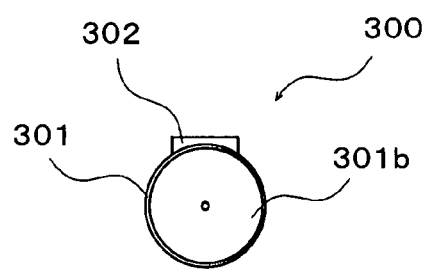

FIGS. 3(*a*) to 3(*c*) are external views of a power source adapting connector 300 serving as a light source device-connecting device of embodiment 2, as viewed from three different directions. FIG. 3(*a*) is an external view of the power source adapting connector 300 as viewed from the front thereof, and FIG. 3(*b*) is an external view as viewed from the upper side thereof. Further, FIG. 3(*c*) is an external view of the power source adapting connector 300 as viewed from the right end thereof.

The power source adapting connector 300 has an external shape which is formed so as to conform to the shape of the socket 1001 for receiving the conventional bulb-type lamp 802 described above. As shown in FIGS. 3(*a*) to 3(*c*), the power source adapting connector 300 includes: a connector housing 301 which contains therein a female connector 302 and has a positive electrode 301*a* and a negative electrode 301*b* formed on the left and right end portions, respectively, of the exterior thereof; and the female connector 302 which is contained in the connector housing 301 and is to be connected to the male connector 210 of the light source unit 200 described above.

As shown in FIG. 3(*b*), pin-shaped connection terminals 302*a* and 302*b* are provided inside the female connector 302. The terminals 302*a* and 302*b* are electrically connected to the positive electrode 301*a* and the negative electrode 301*b*, respectively, formed on the connector housing 301.

With the above configuration, the power source adapting connector 300 can be fitted into the socket 1001 provided in the lighting-power supply unit 1000 described above without any modification to the socket, in the same manner as conventional bulb-type lamps.

After the power source adapting connector 300 is fitted into the socket 1001, the male connector 210 connected to the lead wires 204 and 205, connected to the light source unit 200, is connected to the female connector 302 in the power source adapting connector 300. Then, the light source unit 200 is seated in a space in the lighting-power supply unit 1000, whereby the attachment operation for the light source unit 200 is completed. At this time, the positive electrode 301*a* and the negative electrode 301*b* of the connector housing 301 of the power source adapting connector 300 are electrically connected to a positive electrode and a negative electrode (not shown), respectively, in the socket 1001.

Thereafter, power from the lighting-power supply unit 1000 can be supplied to the substrate 202 of the light source unit 200 via the positive and negative electrodes (not shown) in the socket 1001, the positive electrode 301*a* and the negative electrode 301*b* of the connector housing 301 of the power source adapting connector 300, the female connector 302 in the connector housing 301, the male connector 210, and the lead wires 204 and 205.

As described above, in the power source adapting connector of the second embodiment, the electrodes and the connector housing thereof are formed such that the electrodes and the external shape of the connector housing conform to the shape of a socket into which a conventional bulb-type lamp is fitted. In addition to this, the female connector connectable to the light source unit is provided in the connector housing. Therefore, the power source adapting connector can be connected to a bulb-type lamp socket in a lighting-power supply unit without any modification to the socket, and thus the connection and seating procedure for the light source unit is simplified.

Hence, when the light source of a vehicle-mounted lighting device is changed from a bulb-type lamp to a light source employing a light emitting diode, no modifications need to be made to the electrical connection structure on a lighting-power source unit side, and the procedure for the electrical connection can be simplified. Therefore, the extension of life and reduction of power consumption of the light source of vehicle-mounted lighting devices can be achieved with a low cost and simple operation.

Third Embodiment

In a third embodiment, a description will now be given of a power source adapting connector for replacing the above bulb-type lamp 803 with the light source unit of the first embodiment.

Figure 4:
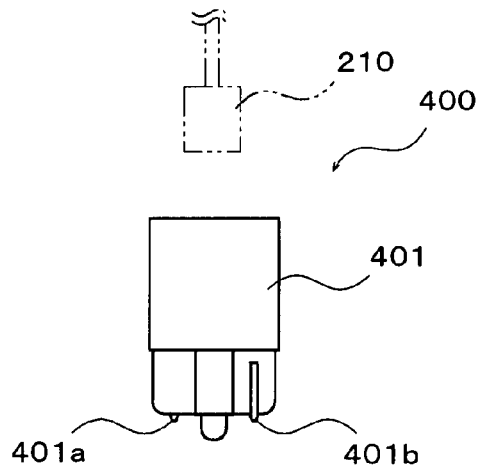
FIGS. 4(a) to 4(c) show a power source adapting connector in accordance with a third embodiment of the present invention, FIG. 4(a) being an external view as viewed from the front of the power source adapting connector, FIG. 4(b) being an external view as viewed from the upper side thereof, and FIG. 4(c) being an external view as viewed from the right end thereof.
Figure 4:
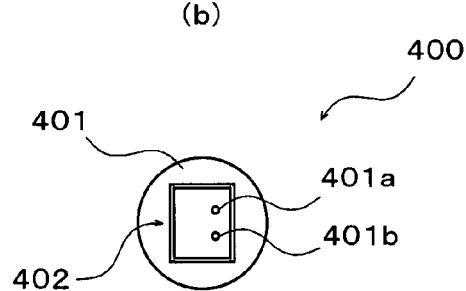
Figure 4:
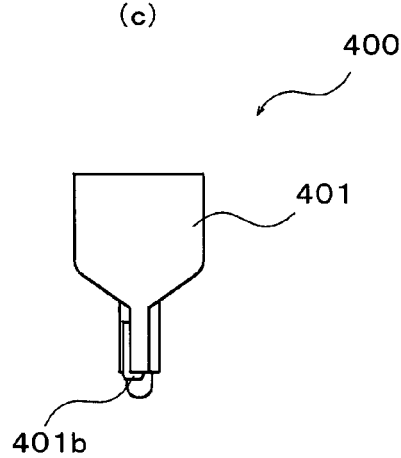
Figure 5:
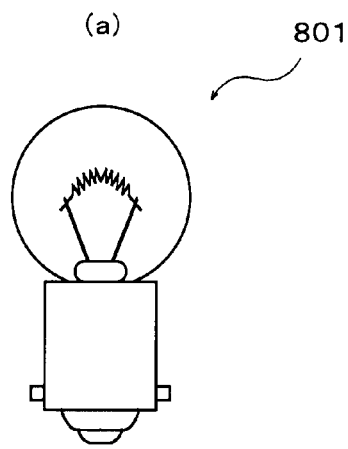
FIGS. 5(a) to 5(c) show conventional bulb-type lamps, FIG. 5(a) being an external view of an example of the conventional bulb-type lamps, FIG. 5(b) being an external view of another example of the conventional bulb-type lamps, and FIG. 5(c) being an external view of yet another example of the conventional bulb-type lamps.
Figure 5:
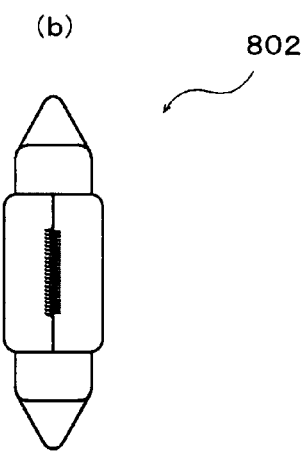
Figure 5:
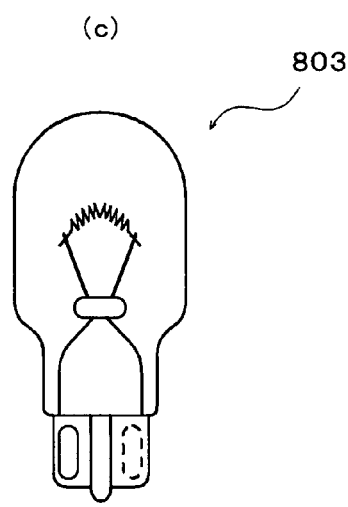
Figure 6:
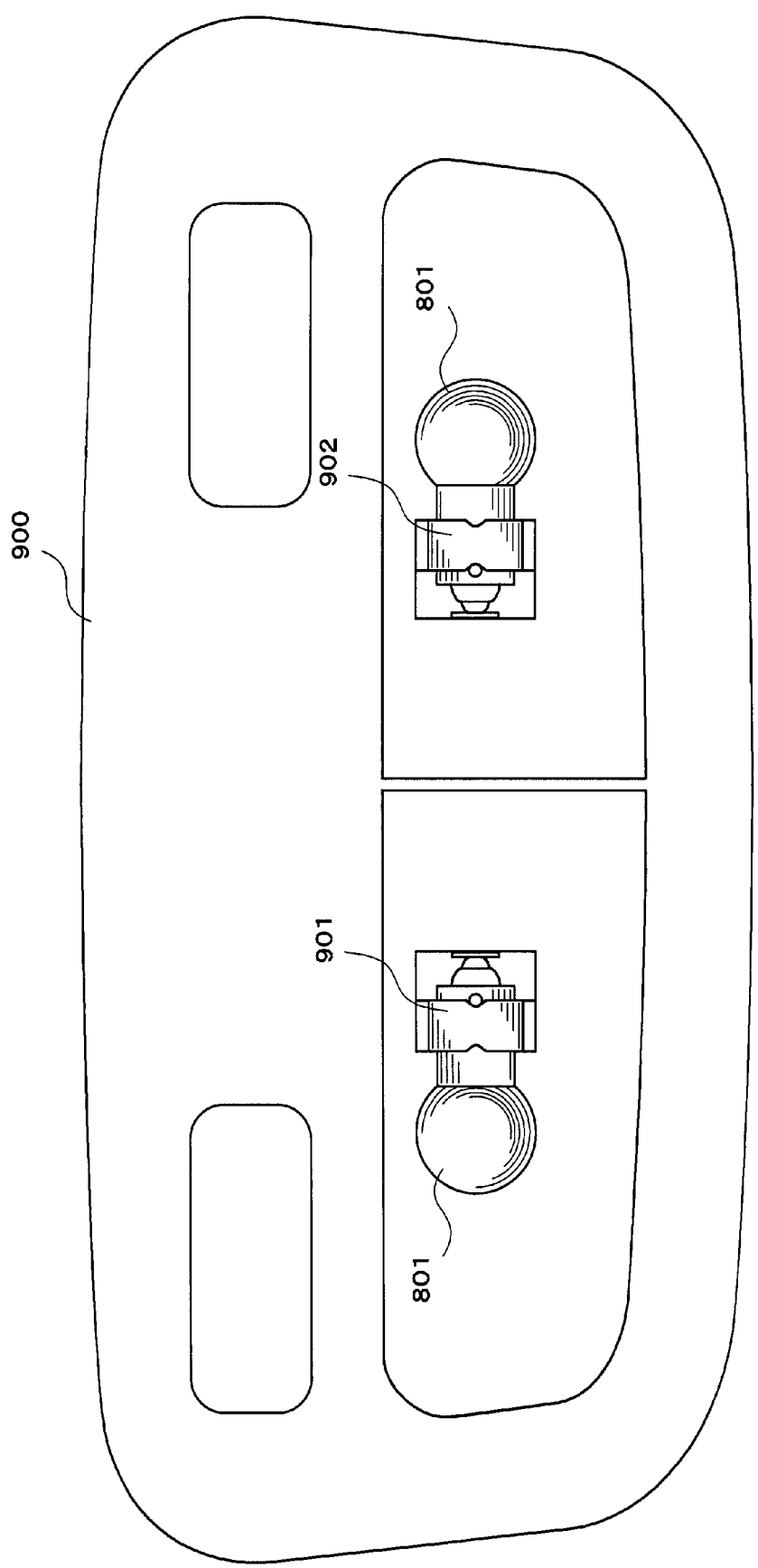
FIG. 6 is a view showing the internal configuration of a conventional lighting-power supply unit.
Figure 7:
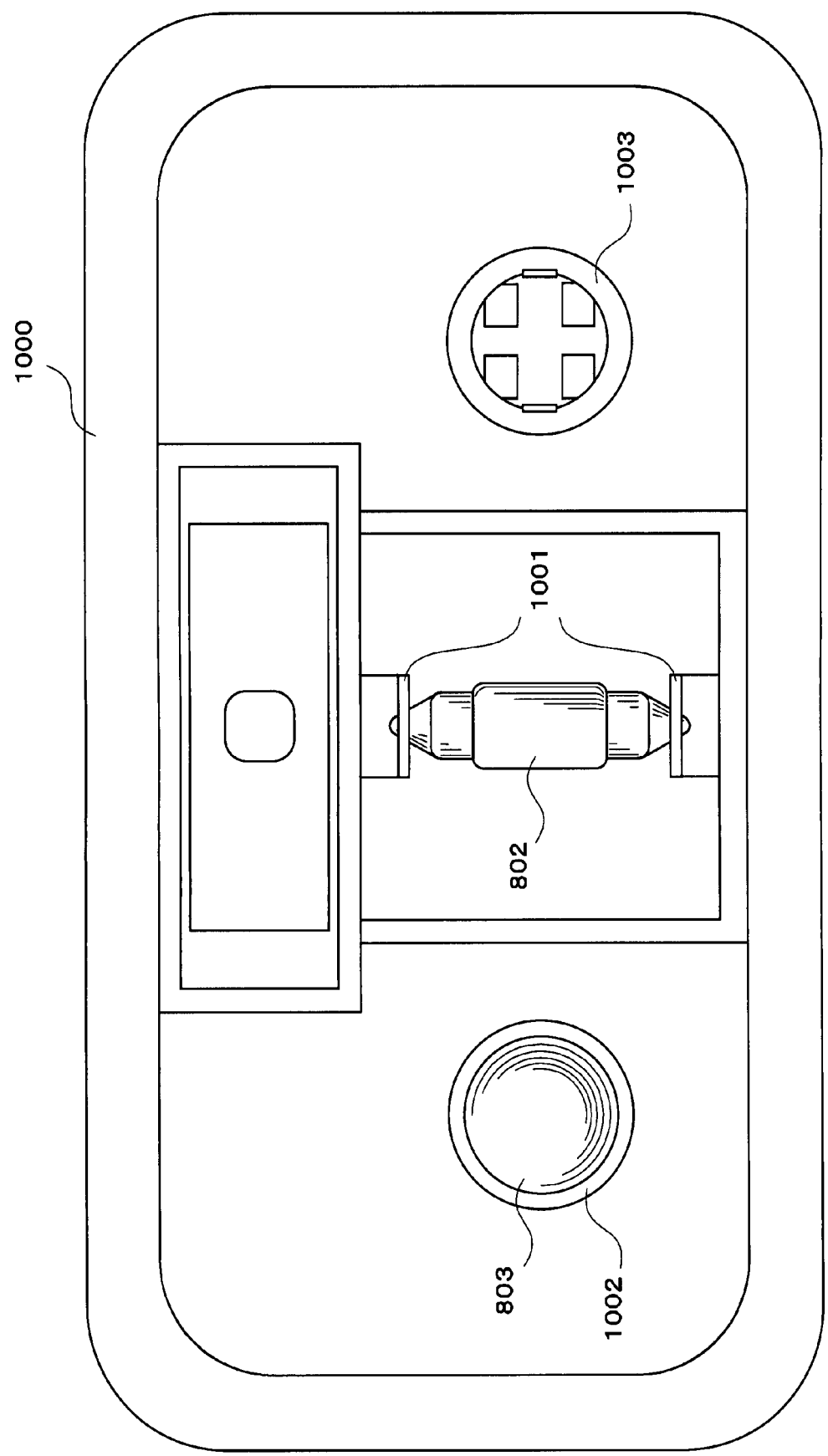
FIG. 7 is a view showing the internal configuration of another conventional lighting-power supply unit.

FIGS. 4(*a*) to 4(*c*) are external views of a power source adapting connector 400 serving as a light source device-connecting device of the third embodiment, as viewed from three different directions. FIG. 4(*a*) is an external view of the power source adapting connector 400 as viewed from the front thereof, and FIG. 4(*b*) is an external view as viewed from the upper side thereof. Further, FIG. 4(*c*) is an external view of the power source adapting connector 400 as viewed from the right end thereof.

The power source adapting connector 400 has an external shape which is formed so as to conform to the shape of the sockets 1002 and 1003 for receiving the conventional bulb-type lamp 803 described above. As shown in FIGS. 4(*a*) to 4(*c*), the power source adapting connector 400 includes: a connector housing 401 which contains therein a female connector 402 and has a positive electrode 401*a* and a negative electrode 401*b* on the front and rear lower end portions, respectively, of the exterior thereof; and the female connector 402 which is contained in the connector housing 401 and is to be connected to the male connector 210 of the light source unit 200 described above.

As shown in FIG. 4(*b*), pin-shaped connection terminals 402*a* and 402*b* are provided inside the female connector 402. The terminals 402*a* and 402*b* are electrically connected to the positive electrode 401*a* and the negative electrode 401*b*, respectively, formed on the connector housing 401.

With the above configuration, the power source adapting connector 400 can be fitted into each of the sockets 1002 and 1003 provided in the lighting-power supply unit 1000 described above without any modification to the sockets, in the same manner as conventional bulb-type lamps.

One power source adapting connector 400 is fitted into the socket 1002, and another one is fitted into the socket 1003. Subsequently, the male connector 210, connected to the lead wires 204 and 205 connected to the light source unit 200, is connected to the female connector 402 in each of the power source adapting connectors 400. Then, each light source unit 200 is seated in a space in the lighting-power supply unit 1000, whereby the attachment operation for each light source unit 200 is completed. At this time, the positive electrode 401*a* and the negative electrode 401*b* of the connector housing 401 of each of the power source adapting connectors 400 are electrically connected to a positive electrode and a negative electrode (not shown), respectively, in each of the sockets 1002 and 1003.

Thereafter, power from the lighting-power supply unit 1000 is supplied to the substrate 202 of each light source unit 200 via the positive and negative electrodes (not shown) in each of the sockets 1002 and 1003, the positive electrode 401*a* and the negative electrode 401*b* of the connector housing 401 of each of the power source adapting connectors 400, the male connector 210, and the lead wires 204 and 205.

As described above, in the power source adapting connector of the third embodiment, the electrodes and the connector housing thereof are formed such that the electrodes and the external shape of the connector housing conform to the shape of a socket into which a conventional bulb-type lamp is fitted.

In addition to this, the female connector connectable to the light source unit is provided in the connector housing. Therefore, the power source adapting connector can be fitted into a bulb-type lamp socket in a lighting-power supply unit without any modification to the socket, and thus the connection and seating procedure for the light source unit is simplified.

Hence, when the light source of a lighting device is changed from a bulb-type lamp to a light source employing a light emitting diode, no modifications need to be made to the electrical connection structure on a lighting-power source unit side, and the procedure for the electrical connection can be simplified. Therefore, the extension of life and reduction of power consumption of lighting devices can be achieved with a low cost and simple operation.

It should be noted that the connecting device of the present invention and the light source device connected to the connecting device are not limited to those described in the first to third embodiments described above. Of course, various modifications may be made without departing from the scope of the present invention. Moreover, in the first to third embodiments above, the description has been given only of the case where the present invention is applied to in-vehicle lighting. However, the invention is applicable to side lamps and the like of vehicles.

The entire disclosure of Japanese Utility Model Application No. 2006-2959 filed on Apr. 19, 2006 including specification, claims, drawings, and summary are incorporated herein by reference in its entirety.

What is claimed is:

1. A light source device which is to be connected to a lighting-power supply unit of a vehicle, the light source device comprising:
    a substrate which has a light emitting diode mounted on a surface thereof and has a circuit pattern formed thereon for supplying power to the light emitting diode;
    a connector having a first end connected to the circuit pattern and a second end connected to a connecting device;
    a protection member disposed in a peripheral portion of the substrate and protruding above a surface of the substrate to protect at least the light emitting diode, said protection member including a protection protrusion which are formed in at least the upper, lower, left, and right side edges of the substrate to surround the light emitting diode; and
    the connecting device comprising:
    a plurality of connector housings, each of said connector housings having a different external shape and different electrode configuration at one end thereof, the different shapes and configurations are formed so as to conform to a shape and an electrode configuration, respectively, of a light source connecting portion of the lighting-power supply unit provided for connecting to the lighting-power supply unit;
    each of said connector housings having at the other end thereof an attaching/detaching member for allowing said connector housings to be interchangeably attached to said second end of said connector; and
    wherein power from the lighting-power supply unit is supplied to the substrate via the connecting device.

2. The light source device according to claim 1, comprising a support plate which is disposed on a rear surface of the substrate and on which the protection member is formed so as for said plurality of protrusions to protrude therefrom.

3. The light source device according to claim 1, comprising a support plate which is disposed on a rear surface of the substrate and on which the protection member is formed so as to protrude therefrom,
wherein a notch portion for avoiding interference with the protection member is formed in the substrate.

4. The light source device according to claim 1, wherein, one of the connector housings is provided for connecting a bulb-type lamp in the lighting-power supply unit.

5. The light source device according to claim 1, wherein one of the plurality of connector housings includes an attaching/detaching plate, the plate comprising a protrusion formed on the outer periphery of the attaching/detaching plate, and wherein the attaching/detaching protrusion protrudes in a radial direction of said one connector housing.

6. The light source device of claim 1 wherein the second end of the connector is a male connector and said attaching/detaching member including a female connector, wherein said male connector is adapted to be removably connected to said female connector.

* * * * *